US006863132B2

(12) United States Patent
Visser

(10) Patent No.: US 6,863,132 B2
(45) Date of Patent: Mar. 8, 2005

(54) HARVESTER FOR HARVESTING CROPS

(76) Inventor: Johannes Antonius Josephus Visser, Thorbeckestraat 416, 6702 Wageningen (NL)

( * ) Notice: Subject to any disclaimer, the term of this patent is extended or adjusted under 35 U.S.C. 154(b) by 0 days.

(21) Appl. No.: 10/312,876

(22) PCT Filed: Jul. 6, 2001

(86) PCT No.: PCT/NL01/00519
§ 371 (c)(1),
(2), (4) Date: Apr. 22, 2003

(87) PCT Pub. No.: WO02/15668
PCT Pub. Date: Feb. 28, 2002

(65) Prior Publication Data
US 2004/0035594 A1 Feb. 26, 2004

(30) Foreign Application Priority Data
Jul. 7, 2000 (NL) ............................................. 1015647

(51) Int. Cl.⁷ ............................................. A01D 17/16
(52) U.S. Cl. ....................................... 171/113; 171/124
(58) Field of Search ............................. 171/18, 84, 85, 171/111–114, 116, 124, 128, 129, 143, 144; 111/906, 908

(56) References Cited

FOREIGN PATENT DOCUMENTS

| BE | 494 488 | 7/1950 |
|----|---------|--------|
| GB | 614 144 | 12/1948 |
| NL | 91 516  | 2/1959 |

*Primary Examiner*—Christopher J. Novosad
(74) *Attorney, Agent, or Firm*—Oblon, Spivak, McClelland, Maier & Neustadt, P.C.

(57) ABSTRACT

A harvester for harvesting a root crop, and more in particular for harvesting potatoes. For that purpose, the root crop and attached soil material is guided towards a rotating helically shaped conveyor track. This conveyor track is provided with sieve openings, which remove attached soil material from the root crop during transportation. Preferably, the helically shaped conveyor track is made of synthetic tubing or rods, which can be bought on a roll.

12 Claims, 5 Drawing Sheets

HARVESTER FOR HARVESTING CROPS

Figure 1:
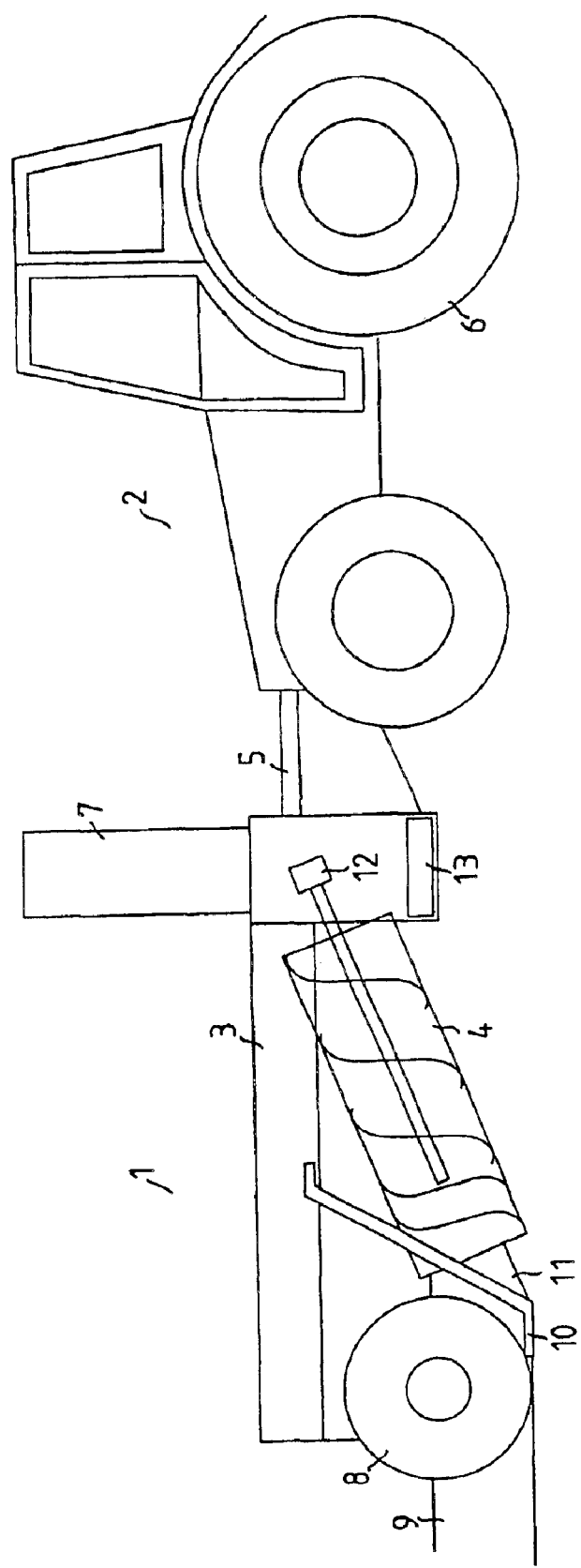

The invention relates to a harvester for harvesting a crop, like potatoes, comprising a conveyor track for transporting the harvested crop, on a first end, operationally situated in close proximity to the ground, provided with cutting means like a knife or a dig up share, on a second end provided with discharging means for the harvested crop, and with sieve means, for removing material attached to the crop during transportation.

A harvester of this type is known for example from GB 614 144 A. In the known harvester, the conveyor track is a worm conveyor and the sieve means is a tubular sieve, mounted round the worm conveyor.

A base for the present invention is the inventive thought that the transport function and the sieve function may be realised in one integrated element, which moreover can be produced substantially cheaper than the known combination. The invention is characterized in that the conveyor track and the sieve means consist of at least one at least substantially helically shaped conveyor track having an open-worked surface and that the helically shaped conveyor track is mounted for rotation round a longitudinal axis. The root crop is transported by the helically shaped conveyor track, which operationally rotates around the longitudinal axis, and during this transportation the unwanted soil, sticking to the root crop is removed by the open-worked surface. The apparatus is more in particular very well suited for harvesting potatoes grown in ridges, in which case the ridge is lifted up by the cutting means and the soil plus the potatoes contained in it are supplied to the first end of the helically shaped conveyor track. Of course it is possible to mount a number of helically shaped conveyor tracks side by side, in which case a number of ridges can be treated simultaneously.

A preferred embodiment of the harvester is characterized in that the helically shaped conveyor track is connected to a central shaft which at least substantially coincides with the longitudinal axis and that the central shaft is provided with drive means or with coupling means. This central shaft, which is preferably tubular shaped, supports the helically shaped conveyor track, as a result of which the helically shaped conveyor track can be designed having a reduced weight. It is sufficient then to use a single bearing for the central shaft, mounted near the second end. This provides a designer with additional possibilities when designing the apparatus. Moreover, it simplifies the supply of harvested crop to the helically shaped conveyor track.

Another preferred embodiment of the harvester is characterized in that adjusting means are provided, for adjusting a working angle for the helically shaped conveyor track. In this way, its position can be adapted to the specific working conditions. It is also possible then to position the apparatus for example in a transport position, in which a distance between the helically shaped conveyor track and the ground is increased in order to prevent damage and to simplify the transportation. This is more in particular the case when the supply side of the helically shaped conveyor track can be moved between a non-operational position, well above the ground, and an operational position in which the supply side of the helically shaped conveyor track is moved towards the ground. In practise, the angular position of the conveyor track can be determined for example by the height of the apparatus, the position of one or more support wheels and/or the lifting height of the vehicle, which pushes or pulls the apparatus.

A favourable embodiment according to another aspect of the invention is characterized in that near the first end adjacent turns of the helically shaped conveyor track substantially join and that near the second end the adjacent turns do not join. In this case, the joint windings as such form a supply opening, while the remaining windings realize more in particular the transportation and the sieving.

Another favourable embodiment of the apparatus is characterized in that the helically shaped conveyor track is provided with an opening extending in a longitudinal direction, such that a trough-shaped or half-pipe shaped tube is obtained. In this way the weight of the helically shaped conveyor track may be further reduced. Moreover, the open structure simplifies the removal of a possible obstacle from the helically shaped conveyor track.

Another favourable embodiment of the apparatus is characterized in that the helically shaped conveyor track is provided with sieve openings, which extend at least substantially in a longitudinal direction of the helically shaped conveyor track. This reduces the chance that material attached to the crop, like tops, will get caught at the end of the openings and will become an obstacle.

Another favourable embodiment of the apparatus is characterized in that the width of a sieve opening increases in a direction from the first end towards the second end, such that material attached to the crop that might get stuck will gradually move towards the second end and will automatically loosen.

A favourable embodiment according to another aspect of the invention is characterized in that the helically shaped conveyor track is built up of rod-shaped or tube-shaped elements, extending in a longitudinal direction. The central shaft is provided then with a number of radially extending spokes, to which mounting brackets are connected which determine the position and the cross sectional shape of the helically shaped conveyor track. The rod-shaped or tube-shaped elements can be mounted in a further obvious manner to the brackets. In this way, a perfectly smooth inner surface is obtained, which reduces the risk of damaging the root crop, while moreover the components of which the apparatus is assembled can be manufactured relatively simple. In order to reduce the weight of the helically shaped conveyor track even further, the rod-shaped or tube-shaped elements are preferably made of a synthetic material, like polyethylene. Tubes made of polyethylene can be bought rolled-up and can easily be forced into a spiral shape. The desired helically shaped structure can be obtained then by mounting a sufficient number of brackets to the central shaft and by next mounting the polyethylene tubes to these brackets. An additional advantage is that the user can easily repair damage, simply by replacing a few tubes with tube taken fresh from the roll.

Another favourable embodiment of the apparatus is characterized in that at least part of the tubes is provided with a metal core. One may for example provide the two tubes, which are situated on the outside of the helically shaped conveyor track with a metal core. This makes the helically shaped conveyor track as such more robust, but the tubes with a metal core also provide for a rigid connection between the mounting brackets mutually, as a result of which the entire construction becomes more robust.

Figure 2:
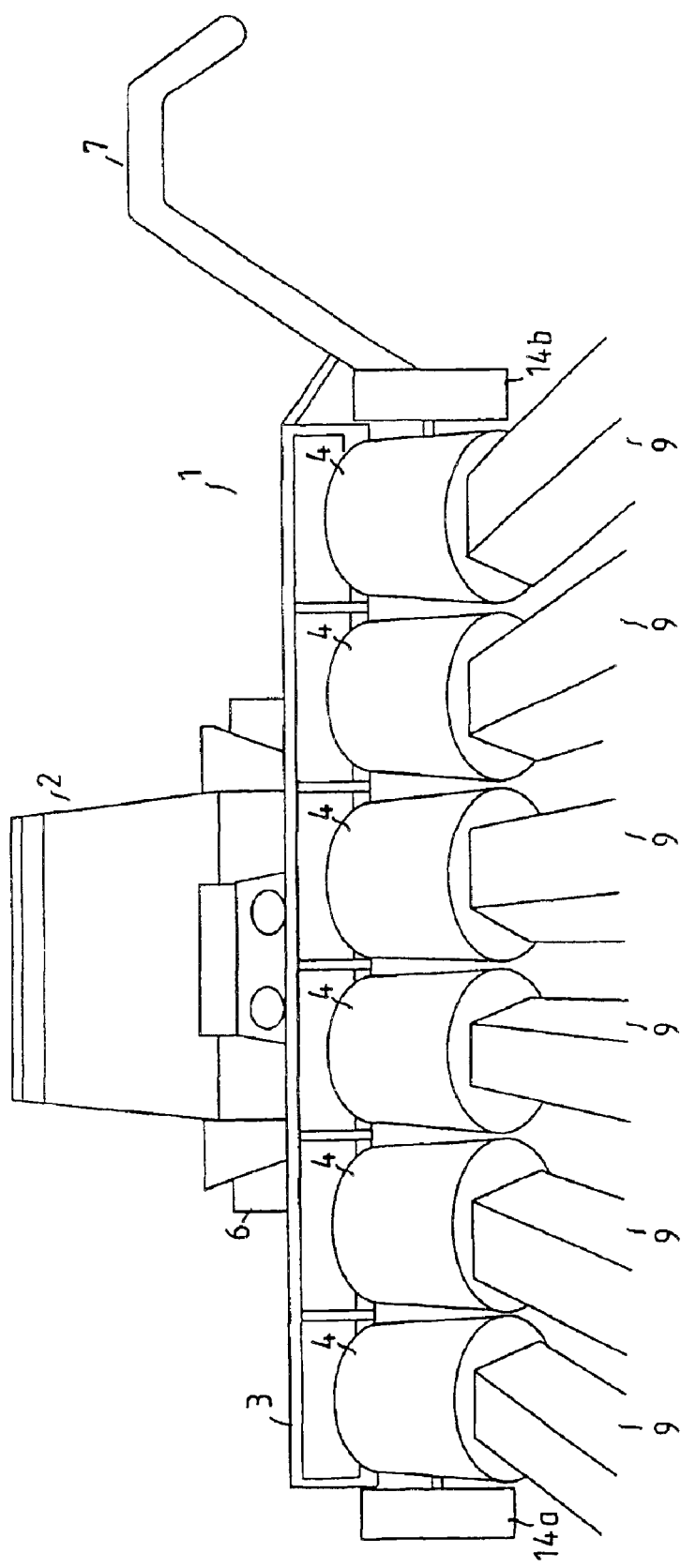
Figure 3:
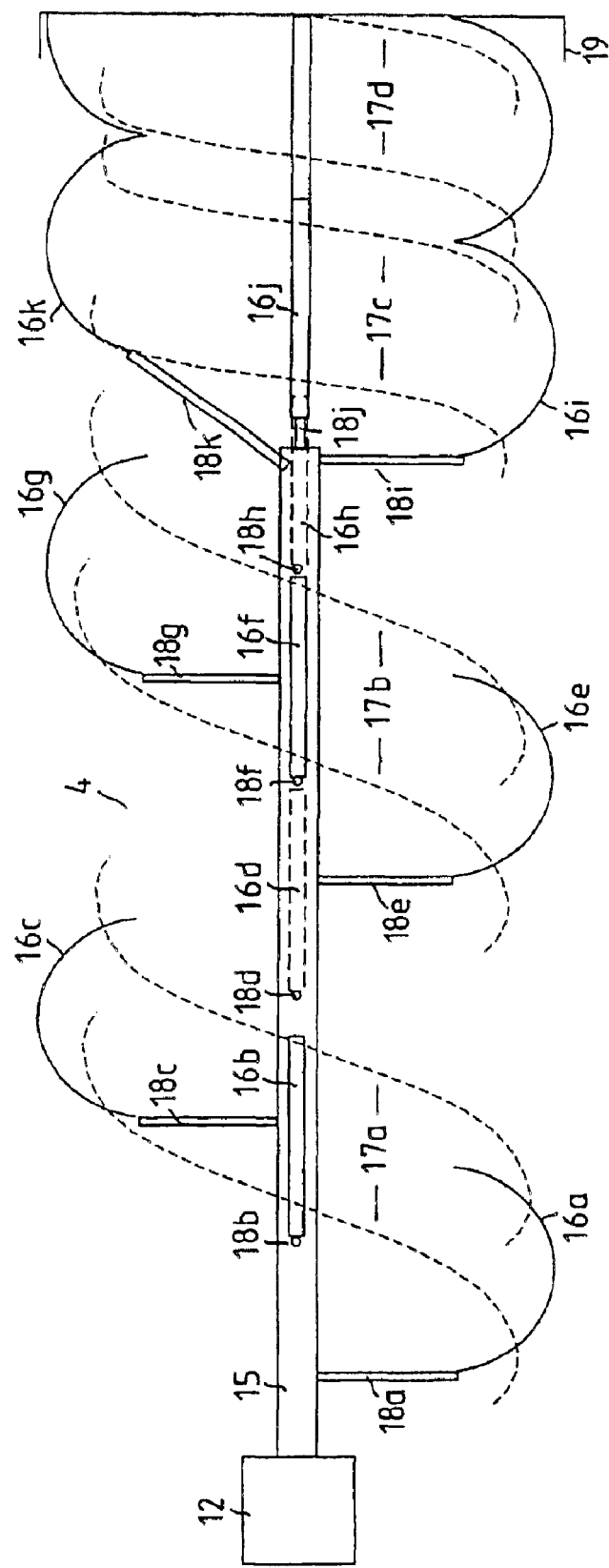
Figure 4:
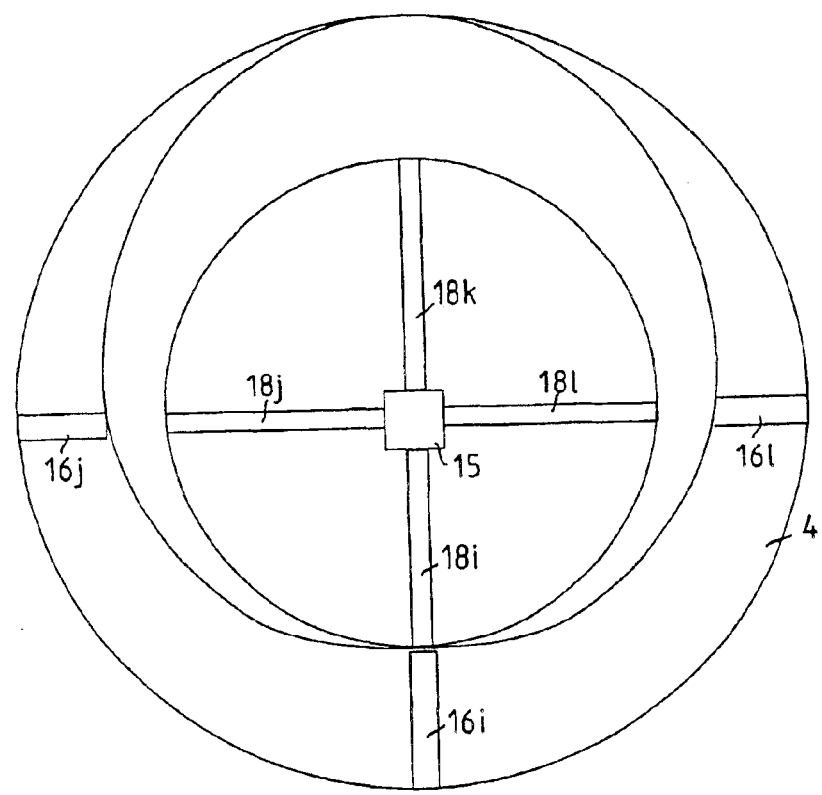
Figure 5:
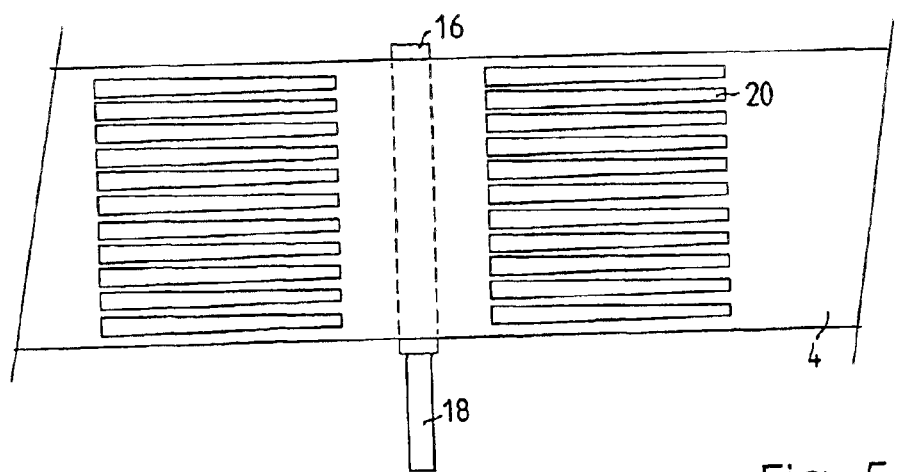
Figure 6:
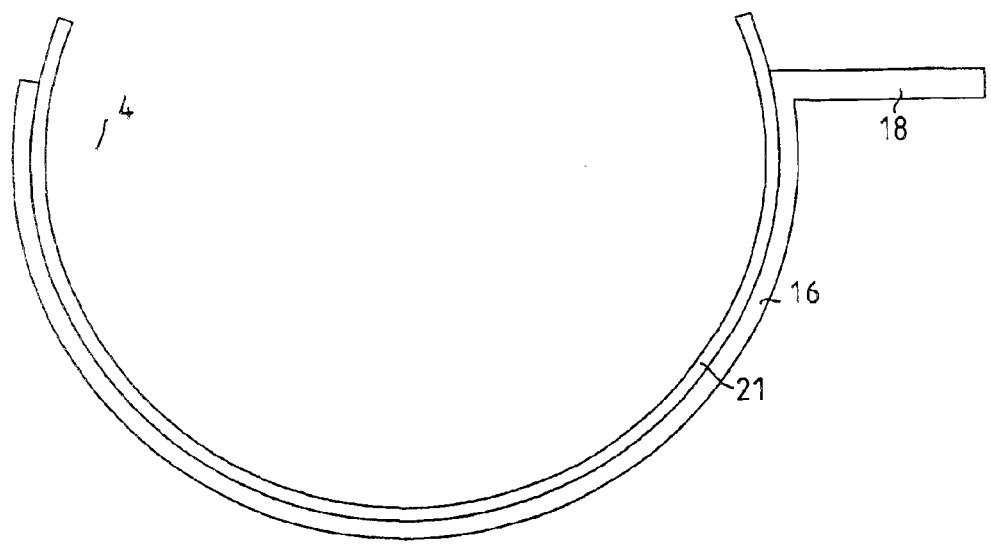
Figure 7:
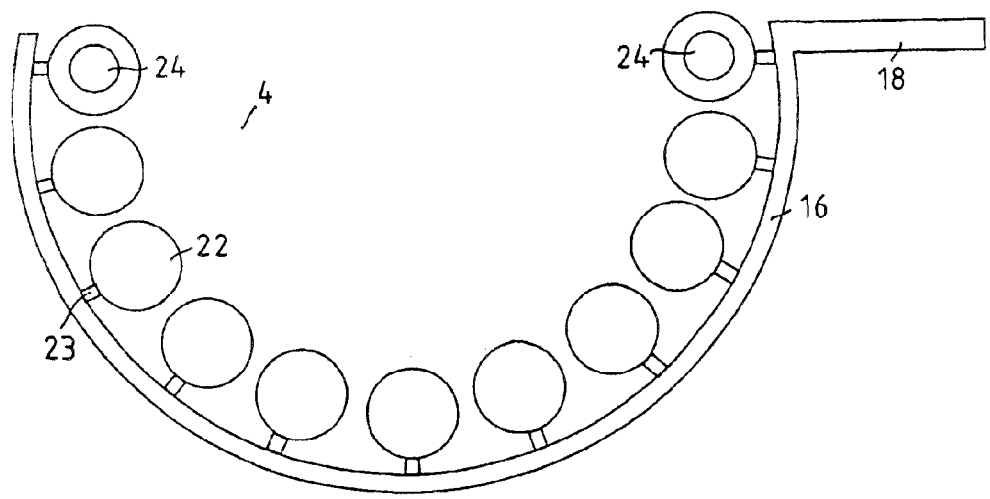

The invention will now be further explained with a reference to the embodiments shown in the following figures, in which:

FIG. 1 shows in side view a harvester according to the invention under operational conditions, coupled to a tractor, FIG. 2 shows in front view the harvester according to the invention under operational conditions, coupled to a tractor, FIG. 3 schematically shows in side view the central shaft, the mounting brackets and the helically shaped conveyor track, FIG. 4 schematically shows in front view the central shaft, the mounting brackets and the helically shaped conveyor track, FIG. 5 schematically shows a part of the helically shaped conveyor track, provided with sieve openings, FIG. 6 schematically shows in cross section the helically shaped conveyor track, made of a single tube, FIG. 7 schematically shows in cross section the helically shaped conveyor track, made of rods or tubes.

FIG. 1 shows in side view a harvester 1 according to the invention under operational conditions, coupled to a tractor 2. The harvester is provided with a conveyor track housing 3 in which helically shaped conveyors 4 are housed. The conveyor track housing 3 is pivotally mounted to a supporting arm 5, which in turn is mounted to tractor 2. The harvester is preferably mounted as shown in front of tractor 2, as a result of which a crop can be harvested even from soil that is difficult to operate upon, for example very wet soil, as the harvester 1 removes the crop from the soil before tractor 2 is driven across. For that reason there are no limits imposed on the wheel pressure and the width of wheels 6 of tractor 2. With the aid of an elevator belt 7, mounted to a side of conveyor track housing 3, the harvested and cleaned root crop is discharged in a bunker van or a tipper of a known type, not shown in the figure. For a sufficient support, conveyor track housing 3 is moreover provided with support wheels 8 or diabolo rolls, which closely follow the ridges 9 to be harvested. In the harvesting process, the ridges are cut loose in a way well known in the art with knives or dig up shares, mounted to arms 10, and the crop with soil attached to it is moved towards the corresponding helically shaped conveyor track 4 via a slightly rising plate 11. The helically shaped conveyor track is rotated by a motor 12 or with the aid of a power take-off of tractor 2, such that the root crop is transported upwards and lands on a collector belt 13 which transports the crop towards elevator belt 7. The soil, attached to the root crop falls through sieve openings in helically shaped conveyor track 4 directly to the ground.

FIG. 2 shows in front view the harvester 1 according to the invention under operational conditions, coupled to a tractor 2. The harvester is provided with a conveyor track housing 3 in which helically shaped conveyor tracks 4 are mounted. In the embodiment shown here, two support wheels 14a, 14b are mounted to conveyor track housing 3, one on each side. The advantage is that it can be seen clearly how each ridge is processed by one helically shaped conveyor track 4. The crop which is harvested in this manner lands on a collector belt, not visible in the figure, and next on an elevator belt 7, which directs the crop towards a bunker van or a tipper of a known type, not shown in the figure. FIG. 3 schematically shows in side view a central shaft 15 and the helically shaped conveyor track 4, provided with mounting brackets 16a, . . . , 16k and, not visible in this figure, 16l. The mounting brackets determine the shape of helically shaped conveyor track 4, which consists in the embodiment shown here of four turns 17a, 17b, 17c, 17d. Near motor 12, the turns of helically shaped conveyor track 4 are mutually separated, which has as an advantage that a good transportation function is obtained. Moreover, the separation enables one to remove an obstacle, which might be present in the helically shaped conveyor track, simply by hand. The separation also provides for the necessary room in which spokes 18a, . . . , 18h can be mounted, via which the mounting brackets 16a, . . . , 16l are connected to central shaft 15. On the other end of central shaft 16, the turns of helically shaped conveyor track 4 unite and form as such a mouth, which may accept the crop and attached soil without the risk that this may disappear between the adjacent turns. Because central shaft 15 would form an obstacle in the mouth, it ends well before the location where the adjacent turns of the helically shaped conveyor track join. In order to support the joint turns sufficiently, the end of central shaft 15 is provided with four additional spokes 18i, 18j, 18k, 18l, of which spoke 18l is not visible in the figure, which support the brackets 16i, 16j, 16k, 16l, belonging to the joint turns. The mouth of helically shaped conveyor track 4 is protected by a cover 19, which is provided with a central opening.

In the embodiment shown, a tubular shaft 15 has been used having a rectangular cross section, which supports the helically shaped conveyor track each quarter of a turn. Of course it is possible to support the conveyor track more often or less often, dependent upon the stiffness of the conveyor track itself. Moreover, the embodiment shows joint turns near the mouth. It is also possible to leave some room between these turns, provided that the gaps between the turns are covered, for example with a well-shaped plate made of metal or a synthetic material.

FIG. 4 schematically shows in front view the central shaft 15, the mounting brackets 16i, 16j, 16l, the helically shaped conveyor track 4 and the spokes 18i, 18j, 18k, 18l, in a situation in which cap 19 has been removed for clarity reasons.

FIG. 5 schematically shows a part of the helically shaped conveyor track 4, supported by a mounting bracket 16 and a spoke 18, provided with sieve openings 20. The sieve openings may assume any possible shape, but in the embodiment shown here they have been made elongated, which reduces the possibility that for example tops or roots, which move in the figure from the right to the left, are caught. The helically shaped conveyor track 4 may for example be made of a thin metal plate, in which the sieve openings 20 have been punched.

FIG. 6 schematically shows in cross section the helically shaped conveyor track, made of a single tube 21, which is periodically supported by brackets 16 and spokes 18. Tube 21 is for example a metal tube which has obtained the desired shape in a bending apparatus, after which part of the tube has been removed and the sieve holes have been made. It is also possible to manufacture tube 21 from a thermoplastic synthetic material, in which case the desired shape may be realised with a mould.

FIG. 7 schematically shows in cross section the helically shaped conveyor track 4, made of rods or tubes 22, which are periodically supported by mounting brackets 16, as shown in FIG. 3. The rod or tube material is preferably purchased as a roll, with a diameter which is substantially equal to the diameter of the helically shaped conveyor track 4. In that case, rod or tube 21 can simply be screwed in place and it assumes the desired helical shape spontaneously. A very favourable material is polyethylene, which is strong and light and which may be purchased as a roll. Preferably, washers 23 are mounted between rods or tubes 22 and mounting brackets 16, thus reducing the risk that material attached to the crop will get caught behind mounting bracket 16. As another very useful refinement one may increase the mutual distance between rods or tubes 22 when going from the mouth towards motor 12. In case any attached material is caught between the rods or tubes, it will gradually be loosened by the passing crop and will ultimately be set free automatically.

It may be advantageous to provide at least part of the tubes with a core 24 made of steel. One may for example, as shown in the figure, provide the two tubes, which are situated on the outside of the helically shaped conveyor track with a metal core. This makes the helically shaped conveyor track as such more robust, but the tubes with a metal core also provide for a rigid connection between the mounting brackets mutually, as a result of which the entire construction becomes more robust.

What is claimed is:

1. A harvester for harvesting a crop, comprising:

on a first end, a conveyor track configured to transport the harvested crop and including a cutter comprising one of a knife or a dig up share;

on a second end, a discharging mechanism configured to discharge the harvested crop;

a sieve mechanism configured to remove material attached to the crop during transport, wherein said conveyor track and said sieve mechanism include at least one substantially helically shaped conveyor track having an open-worked surface, said at least one helically shaped conveyor track being mounted for rotation about a longitudinal axis and connected to a central shaft which at least substantially coincides with the longitudinal axis, said central shaft being configured to be driven.

2. The harvester of claim 1, further comprising:

an adjusting mechanism configured to adjust a working angle for the at least one helically shaped conveyor track.

3. The harvester of claim 1, wherein adjacent turns of the at least one helically shaped conveyor track adjacent to the first end substantially join one another and the adjacent turns of the at least one helically shaped conveyor track adjacent to the second end do not substantially join one another.

4. The harvester of claim 3, wherein, the at least one helically shaped conveyor track is provided with an opening extending in a longitudinal direction such that a trough-shaped or half-pipe shaped tube is obtained.

5. The harvester of claim 4, wherein, the at least one helically shaped conveyor track is provided with sieve openings which extend at least substantially in a longitudinal direction of the helically shaped conveyor track.

6. The harvester of claim 5, wherein, the width of at least one sieve opening increases in a direction from the first end towards the second end.

7. The harvester of claim 6, wherein the at least one helically shaped conveyor track is built up of rod-shaped or tube-shaped elements extending in a longitudinal direction.

8. The harvester of claim 7, wherein the rod-shaped or tube-shaped elements are at least in part formed as tubes made of synthetic material.

9. The harvester of claim 8, wherein at least part of the tubes have a metal core.

10. The harvester of claim 5, wherein, the at least one helically shaped conveyor track is built up of rod-shaped or tube-shaped elements extending in a longitudinal direction.

11. The harvester of claim 10, wherein, the rod-shaped or tube-shaped elements are at least in part formed as tubes made of a synthetic material.

12. The harvester of claim 11, wherein, at least part of the tubes have a metal core.

* * * * *